(12) United States Patent
Surace

(10) Patent No.: US 10,598,025 B2
(45) Date of Patent: Mar. 24, 2020

(54) AIRFOIL WITH RODS ADJACENT A CORE STRUCTURE

(71) Applicant: United Technologies Corporation, Farmington, CT (US)

(72) Inventor: Raymond Surace, Newington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 568 days.

(21) Appl. No.: 15/354,097

(22) Filed: Nov. 17, 2016

(65) Prior Publication Data

US 2018/0135422 A1    May 17, 2018

(51) Int. Cl.
| | |
|---|---|
| *F01D 5/14* | (2006.01) |
| *F02C 3/04* | (2006.01) |
| *F04D 29/58* | (2006.01) |
| *F04D 29/02* | (2006.01) |
| *F01D 9/04* | (2006.01) |
| *F04D 29/54* | (2006.01) |
| *F04D 29/38* | (2006.01) |
| *F01D 5/18* | (2006.01) |
| *F01D 5/28* | (2006.01) |

(52) U.S. Cl.
CPC .............. *F01D 5/147* (2013.01); *F01D 5/18* (2013.01); *F01D 5/284* (2013.01); *F01D 9/041* (2013.01); *F02C 3/04* (2013.01); *F04D 29/023* (2013.01); *F04D 29/388* (2013.01); *F04D 29/541* (2013.01); *F04D 29/582* (2013.01); *F05D 2220/32* (2013.01); *F05D 2230/60* (2013.01); *F05D 2240/12* (2013.01); *F05D 2240/30* (2013.01); *F05D 2240/303* (2013.01); *F05D 2240/35* (2013.01); *F05D 2260/20* (2013.01); *F05D 2300/20* (2013.01); *Y02T 50/672* (2013.01); *Y02T 50/676* (2013.01)

(58) Field of Classification Search
None
See application file for complete search history.

(56) References Cited

U.S. PATENT DOCUMENTS

| | | | |
|---|---|---|---|
| 2,780,435 A | 2/1957 | Woodrow | |
| 2,958,505 A | 11/1960 | Frank | |
| 3,215,511 A | 11/1965 | Chisholm | |
| 3,689,178 A * | 9/1972 | Faber | B64C 3/26 |
| | | | 416/224 |

(Continued)

FOREIGN PATENT DOCUMENTS

| | | |
|---|---|---|
| DE | 715421 | 12/1941 |
| EP | 0764764 | 3/1997 |

(Continued)

OTHER PUBLICATIONS

European Search Report for European Patent Application No. 17202243.6 completed Apr. 17, 2018.

(Continued)

*Primary Examiner* — Dwayne J White
*Assistant Examiner* — Jason G Davis
(74) *Attorney, Agent, or Firm* — Carlson, Gaskey & Olds, P.C.

(57) ABSTRACT

An airfoil includes an airfoil section defining an airfoil profile, the airfoil section including a core structure and a plurality of rods disposed adjacent the core structure.

22 Claims, 3 Drawing Sheets

(56) References Cited

U.S. PATENT DOCUMENTS

| | | | |
|---|---|---|---|
| 3,844,728 A * | 10/1974 | Copley | F01D 5/147 164/108 |
| 4,137,008 A | 1/1979 | Grant et al. | |
| 4,247,259 A | 1/1981 | Saboe et al. | |
| 4,396,349 A | 8/1983 | Hueber | |
| 4,914,794 A | 4/1990 | Strangman | |
| 5,358,379 A | 10/1994 | Pepperman et al. | |
| 5,538,380 A | 7/1996 | Norton et al. | |
| 5,681,616 A | 10/1997 | Gupta et al. | |
| 5,705,231 A | 1/1998 | Nissley et al. | |
| 5,951,892 A | 9/1999 | Wolfla et al. | |
| 6,000,906 A | 12/1999 | Draskovich | |
| 6,102,656 A | 8/2000 | Nissley et al. | |
| 6,224,963 B1 | 5/2001 | Strangman | |
| 6,241,469 B1 * | 6/2001 | Beeck | B22F 7/004 415/115 |
| 6,316,078 B1 | 11/2001 | Smialek | |
| 6,481,966 B2 * | 11/2002 | Beeck | B22D 11/0405 415/115 |
| 6,503,574 B1 | 1/2003 | Skelly et al. | |
| 6,514,046 B1 * | 2/2003 | Morrison | F01D 5/187 416/229 A |
| 6,543,996 B2 | 4/2003 | Koschier | |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,121,787 B2 * | 10/2006 | Jacks | F01D 5/186 415/115 |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,938,624 B2 * | 5/2011 | Tibbott | F01D 5/187 415/115 |
| 7,963,745 B1 | 6/2011 | Liang | |
| 8,079,806 B2 | 12/2011 | Tholen et al. | |
| 8,092,175 B2 * | 1/2012 | Beeck | F01D 5/145 416/223 R |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,366,392 B1 | 2/2013 | Laing | |
| 8,480,366 B2 | 7/2013 | Malecki et al. | |
| 8,506,243 B2 | 8/2013 | Strock et al. | |
| 8,821,124 B2 | 9/2014 | Viens et al. | |
| 2008/0159850 A1 | 7/2008 | Tholen et al. | |
| 2010/0068034 A1 * | 3/2010 | Schiavo | F01D 5/189 415/115 |
| 2010/0136258 A1 | 6/2010 | Strock et al. | |
| 2013/0251538 A1 * | 9/2013 | Zess | F01D 5/187 416/90 R |
| 2014/0044555 A1 * | 2/2014 | Lewis | F01D 5/18 416/96 R |
| 2016/0090851 A1 | 3/2016 | Carr et al. | |

FOREIGN PATENT DOCUMENTS

| | | |
|---|---|---|
| EP | 1764481 | 3/2007 |
| EP | 2105579 | 9/2009 |
| EP | 2853688 | 4/2015 |
| GB | 235304 | 6/1925 |
| GB | 2272453 | 5/1994 |
| JP | 61066802 | 4/1986 |
| JP | 05321602 | 12/1993 |

OTHER PUBLICATIONS

U.S. Appl. No. 13/429,474, filed Mar. 26, 2012.
U.S. Appl. No. 14/659,718, filed Mar. 17, 2015.
U.S. Appl. No. 14/812,668, filed Jul. 29, 2015.

* cited by examiner

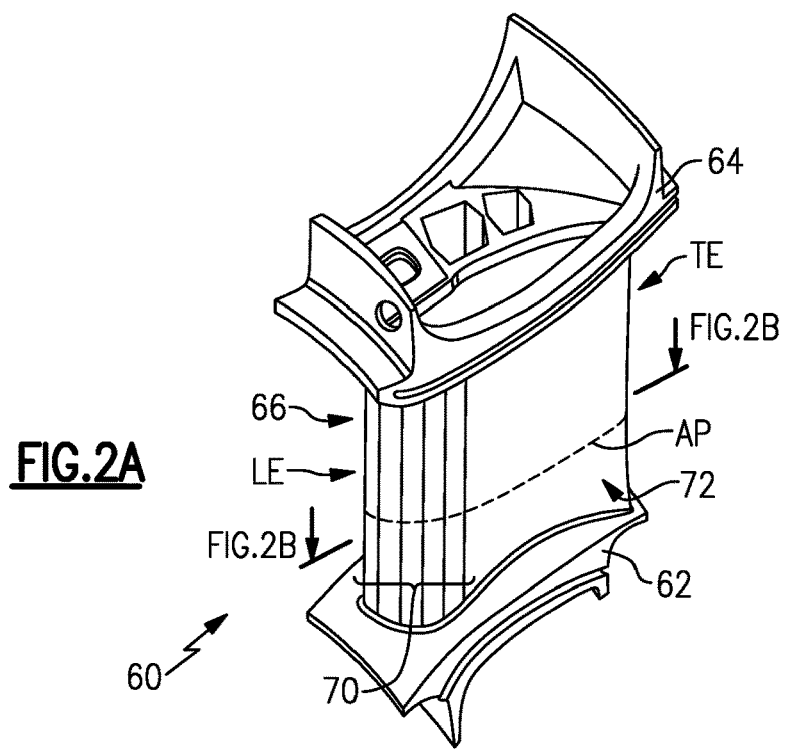
FIG.2A
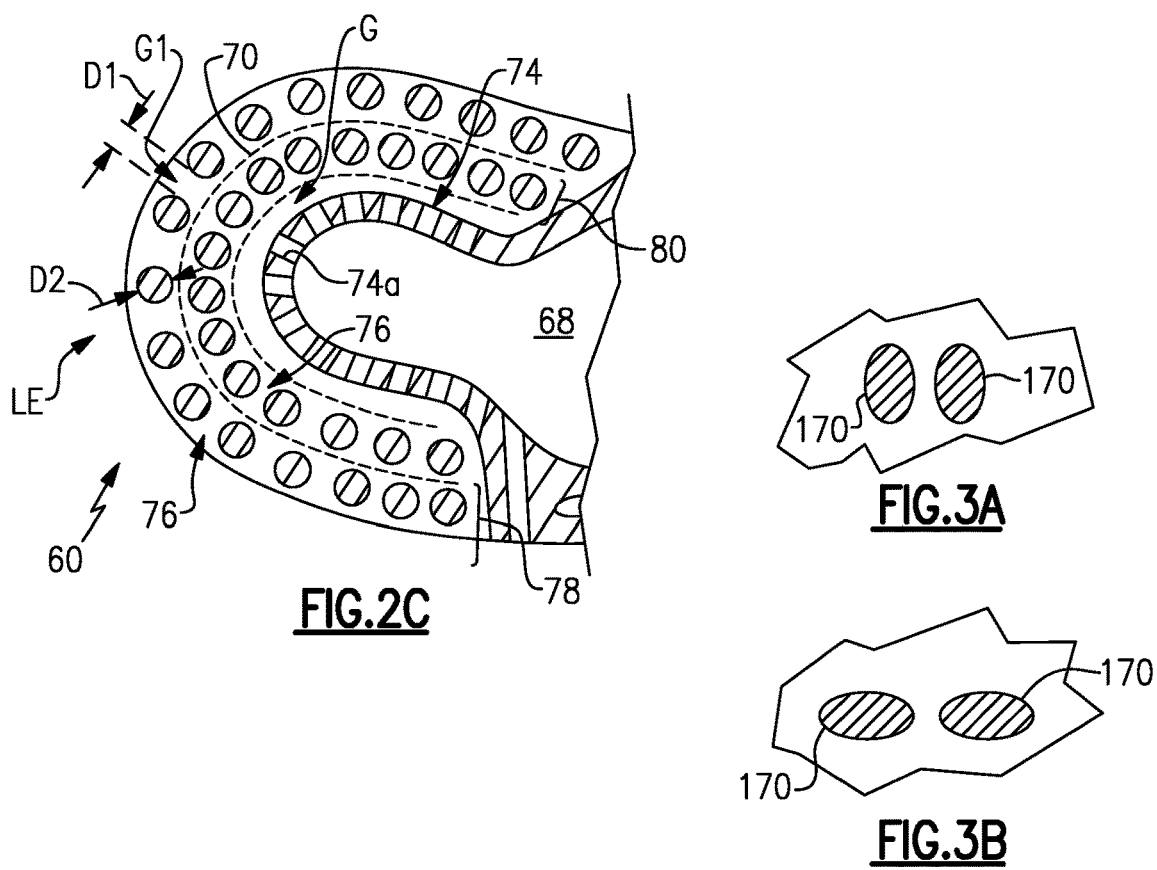
FIG.2C
FIG.3A
FIG.3B

AIRFOIL WITH RODS ADJACENT A CORE STRUCTURE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil section that defines an airfoil profile. The airfoil section has a core structure, and a plurality of rods disposed adjacent the core structure.

In a further embodiment of any of the foregoing embodiments, the plurality of rods form at least a portion of the airfoil profile.

In a further embodiment of any of the foregoing embodiments, the plurality of rods are spaced from the core structure such that there is a gap between the plurality of rods and the core structure.

In a further embodiment of any of the foregoing embodiments, the core structure includes cooling holes that open to the gap.

In a further embodiment of any of the foregoing embodiments, the rods are spaced-apart and define channels there between.

In a further embodiment of any of the foregoing embodiments, the channels are circuitous.

In a further embodiment of any of the foregoing embodiments, the plurality of rods includes a first, outer row of spaced-apart rods and a second, inner row of spaced-apart rods.

In a further embodiment of any of the foregoing embodiments, the rods of the second row are staggered from the rods of the first row such that the rods of the second row align with gaps between the rods of the first row.

In a further embodiment of any of the foregoing embodiments, the rods of at least one of the first row or the second row are uniformly spaced apart.

In a further embodiment of any of the foregoing embodiments, the first row includes a number of rods and the second row includes a number of rods that is less than the number of rods in the first row.

In a further embodiment of any of the foregoing embodiments, each of the rods has a uniform geometric cross-section and is solid.

In a further embodiment of any of the foregoing embodiments, the uniform geometric cross-sections are equal in area.

In a further embodiment of any of the foregoing embodiments, each of the rods is spaced apart from another nearest rod or rods by a distance. Each of the rods defines a characteristic maximum cross-sectional dimension, and a ratio of the characteristic maximum cross-sectional dimension to the distance is from 5 to 30.

In a further embodiment of any of the foregoing embodiments, the rods are ceramic and the core structure is metal.

In a further embodiment of any of the foregoing embodiments, the airfoil section includes inner and outer platforms, and the plurality of rods is affixed between the inner and outer platforms but is not directly secured to the core structure.

A gas turbine engine according to an example of the present disclosure includes a compressor section, a combustor in fluid communication with the compressor section, and a turbine section in fluid communication with the combustor. One of the turbine section or the compressor section includes an airfoil that has an airfoil section that defines an airfoil profile. The airfoil section includes a core structure, and a plurality of rods disposed adjacent the core structure.

In a further embodiment of any of the foregoing embodiments, the plurality of rods form at least a portion of the airfoil profile. The plurality of rods are spaced from the core structure such that there is a gap between the plurality of rods and the core structure. The core structure includes cooling holes that open to the gap, and the rods are spaced-apart and define channels there between.

In a further embodiment of any of the foregoing embodiments, the plurality of rods includes a first, outer row of spaced-apart rods and a second, inner row of spaced-apart rods, and the rods of the second row are staggered from the rods of the first row such that the rods of the second row align with gaps between the rods of the first row.

In a further embodiment of any of the foregoing embodiments, each of the rods is solid and has a uniform geometric cross-section.

A method of assembling an airfoil according to an example of the present disclosure includes securing a plurality of rods and a core structure between inner and outer platforms to form an airfoil section. The airfoil section has an airfoil profile and the plurality of rods defines at least a portion of the airfoil profile.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2A illustrates an example airfoil in the gas turbine engine.

FIG. 2C illustrates an enlarged view of a portion of the airfoil of FIG. 2B.

FIG. 3A illustrates an example of elliptical rods of an airfoil.

FIG. 3B illustrates another example of elliptical rods of an airfoil.

DETAILED DESCRIPTION

Figure 1:
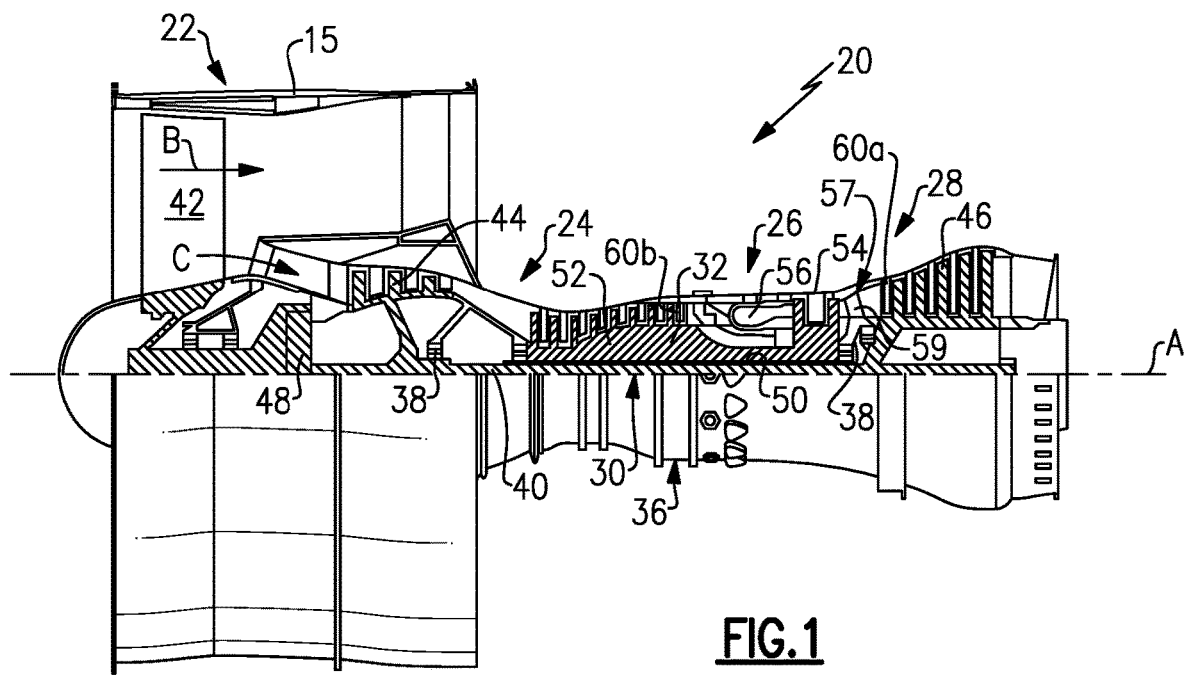
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2B:
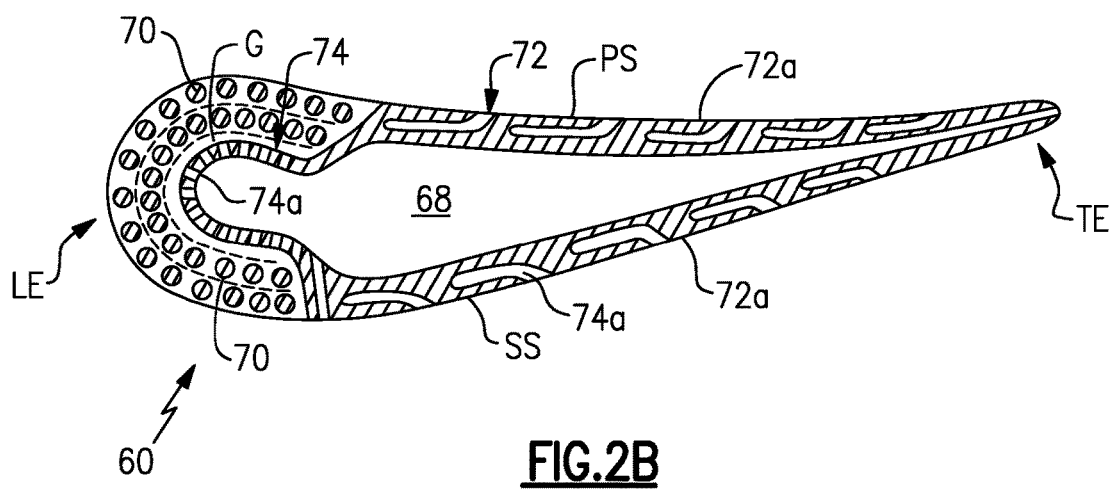
FIG. 2B illustrates a sectioned view of the airfoil of FIG. 2A.

FIG. 2A illustrates one such component, namely an airfoil 60. FIG. 2B illustrates a sectioned view of the airfoil 60, and FIG. 2C illustrates an enlarged view of a portion of the airfoil 60. For instance, the airfoil 60 can be a turbine vane, as represented at 60a in FIG. 1, or a compressor vane, as represented at 60b in FIG. 1. As will be appreciated, although the examples herein are described in the context of a vane, this disclosure is not limited to vanes, and the examples may also be applicable to blades or other airfoils or articles that are exposed to high temperatures.

The airfoil 60 includes inner and outer platforms 62/64 and an airfoil section 66 that extends radially between the inner and outer platforms 62/64. The airfoil section 66 may be hollow and can include one or more internal passages 68. A passage can include a cavity, a channel, or the like.

The airfoil section 66 defines an airfoil profile, AP, which is the peripheral shape of the airfoil section 66 when viewed in a radial direction. For example, the airfoil profile has a wing-like shape that provides a reaction force via Bernoulli's principle with regard to flow over the airfoil section 66. The airfoil profile generally includes a leading end (LE), a trailing end (TE), a pressure side (PS), and a suction side (SS).

The airfoil section 66 includes a plurality of rods, generally designated 70. The rods 70 are affixed between the inner and outer platforms 62/64 adjacent to a core structure 72. For instance, at least some of the rods 70 form a portion of the airfoil profile, which in this example is, or is a portion of, the leading end (LE). It is to be understood that the rods 70 may additionally or alternatively form other portions of the airfoil profile, including the trailing end (TE), the pressure side (PS), and the suction side (SS). The portion of the leading end (LE) that the rods 70 form may cover the incidence angle or range of incidence angles experienced at the leading end (LE) of the airfoil profile (e.g., for variable vane implementations in which the airfoil 60 can be pivoted).

The rods 70 are generally elongated, solid bodies. Each rod 70 may be linear or may be curved over its length in accordance with the shape of the airfoil section 66 (e.g., the rods 70 may be curved if the airfoil section 66 has a twist or sweep). The rods 70 are affixed adjacent the core structure 72 but may not be directly secured to the core structure 72. For instance, the rods 70 are removably secured between the platforms 62/64 so that they can be removed and replaced if needed.

The rods 70 and the core structure 72 may be formed of the same or similar material compositions. More typically though, the rods 70 and core structure 72 are formed of dissimilar materials that are tailored for different environmental conditions that occur at the different locations around the airfoil profile. For instance, the leading end (LE), the pressure side (PS), the suction side (SS), and the trailing end (TE) may be exposed to different environmental conditions that have different temperatures, different corrosion conditions, and/or different erosion conditions. In particular, the leading end (LE) may be exposed to the most severe conditions around the airfoil profile. In this regard, the rods 70 that form the leading end (LE) may be formed of materials that are tailored in accordance with the environmental conditions at the leading end (LE), and the core structure 72 may be formed of materials that are tailored in accordance with the environmental conditions at the pressure side (PS), the suction side (SS), and/or the trailing end (TE).

In one example, the rods 70 are formed of ceramic and the core structure 72 is formed of metal. A ceramic is a compound of metallic or metalloid elements bonded with non-metallic elements or metalloid elements primarily in ionic or covalent bonds. Example ceramic materials may include, but are not limited to, oxides, carbides, nitrides, borides, silicides, and combinations thereof. In further examples, the rods 70 are formed of a monolithic ceramic or a ceramic matrix composite (CMC) that may be formed into the given geometry of the rod 70. For example, a monolithic ceramic is composed of a single, homogenous ceramic material, which may be formed into the geometry of the rods 70. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

The core structure 72 may be formed of a metal, such as a metal alloy. Metal alloys provide a good combination of strength and durability. Example alloys may include, but are not limited to, nickel alloys, cobalt alloys, a nickel alloy coated with cobalt or cobalt alloy, or non-nickel alloys that do not substantially react with ceramic. If enhanced thermal or environmental resistance is desired, the core structure 72 can be coated with a thermal and/or environmental barrier ceramic coating. Of course, if the rods 70 are used at a location that does not require the resistance provided by ceramic, the rods 70 may be formed of one of the metals or metal alloys as listed above for the core structure 72.

The core structure 72 generally includes several portions, defined by the different functions served. The forward portion of the core structure 72 may serve to facilitate cooling the rods 70, and the aft portion of the core structure 72 may serve to define a portion of the airfoil profile. In that regard, the aft portion of the core structure 72 may include exterior wall portions 72a (FIG. 2B) that form a portion of the airfoil profile. In the illustrated example, the exterior wall portions 72a form the trailing end TE of the airfoil profile and at least portions of the pressure side (PS) and the suction side (SS).

The core structure 72 includes a wall 74. In at least the forward portion of the core structure 72, the wall 74 includes one or more cooling holes 74a. The cooling holes 74a are in communication with the passage 68 to provide cooling bleed air through the cooling holes 74a.

The rods 70 are spaced apart from the core structure 72 such that there is a gap G between the rods 70 and the core structure 72. The cooling holes 74a open to the gap G. The gap G serves as a passage for distributing the cooling bleed air from the core structure 72 to the rods 70.

The rods 70 are spaced apart from each other and define channels 76 there between. The cooling bleed air in the gap G flows through the channels 76 and is discharged into the core gas path.

As an example, to enhance cooling, the rods 70 have a staggered arrangement such that the channels 76 are circuitous. For instance, the rods are configured in a first, outer row 78 and a second, inner row 80. The "inner" and "outer" refers to the location relative to the external surroundings of the airfoil section 66 through which hot combustion gas flows in the core gas path.

In this example, the rods 70 of the outer row 78 are uniformly spaced apart by a distance D1 such that there are equal gaps G1 between the rods 70. The rods 70 of the inner row 80 align with the gaps G1. This staggering of the rods 70 between the outer row 78 and the inner row 80 provides the circuitous paths of the channels 76. In one further example, "aligned" refers to the rods 70 of the inner row 80 being positioned near the mouths of the gaps G1 so that there is no straight-line path through the rows 78/80.

Additionally or alternatively, the outer row 78 includes a number of rods 70 and the inner row 80 includes a number of rods 70 that is less than the number of rods 70 in the outer row 78. For the staggered configuration, the number of rods 70 in the inner row 80 is less than the number of rods 70 in the outer row 78 by one. That is, the alignment of the rods 70 of the inner row 80 with the gaps G1 yields a numerical constraint of the number of rods 70.

In an additional example, to enhance cooling, the size and spacing of the rods 70 is controlled in accordance to a preset relationship. For instance, each of the rods 70 is spaced apart from one or more nearest neighboring rods 70 by the distance D1, which is also the minimum distance to the one or more nearest neighboring rods 70. Each rod 70 also has a characteristic maximum cross-sectional dimension, represented at D2. The characteristic maximum cross-sectional dimension is the smallest non-arbitrary dimension of the geometric shape, such as a diameter, a distance from opposed sides or opposed corners, or a minor elliptical axis, for example. In the illustrated example, the rods 70 are of uniform circular area and the characteristic maximum cross-sectional dimension D2 is thus the diameter of the rod 70. A ratio of the characteristic maximum cross-sectional dimension D2 to the distance D1 is from 5 to 30. Thus, the size of the rods 70 is five to thirty times larger than the size of the gap G1. The ratio provides a parameter of size and circuitousness of the channels 76 to facilitate proper flow and cooling.

Although the rods 70 are shown with equal area circular cross-sections, the rods 70 could alternatively be other equal area geometries, such as but not limited to, elliptical or polygonal geometries. Most typically, the geometry will be elliptical, to avoid corners that may impede flow. For instance, FIG. 3A shows another example of the rods 170. In this disclosure, like reference numerals designate like elements where appropriate and reference numerals with the addition of one-hundred or multiples thereof designate modified elements that are understood to incorporate the same features and benefits of the corresponding elements. In this example, the rods 170 are elliptical. Further, the rods 170 are oriented side-to-side. Alternatively, as shown in FIG. 3B, the rods 170 may be oriented end-to-end. For instance, the rows 78/80 described above may alternatively have the rods 170 that are oriented side-to-side, end-to-end, or both. As will be appreciated, the rows 78/80 may also have a mix of rods with the same cross-sectional geometry but in different sizes, and/or rods with two or more different cross-sectional geometries (e.g., circular and elliptical). For instance, the first row 78 may have larger rods than the rods of the second row 80 and/or rods of different geometry than the rods of the second row 80.

Figure 4:
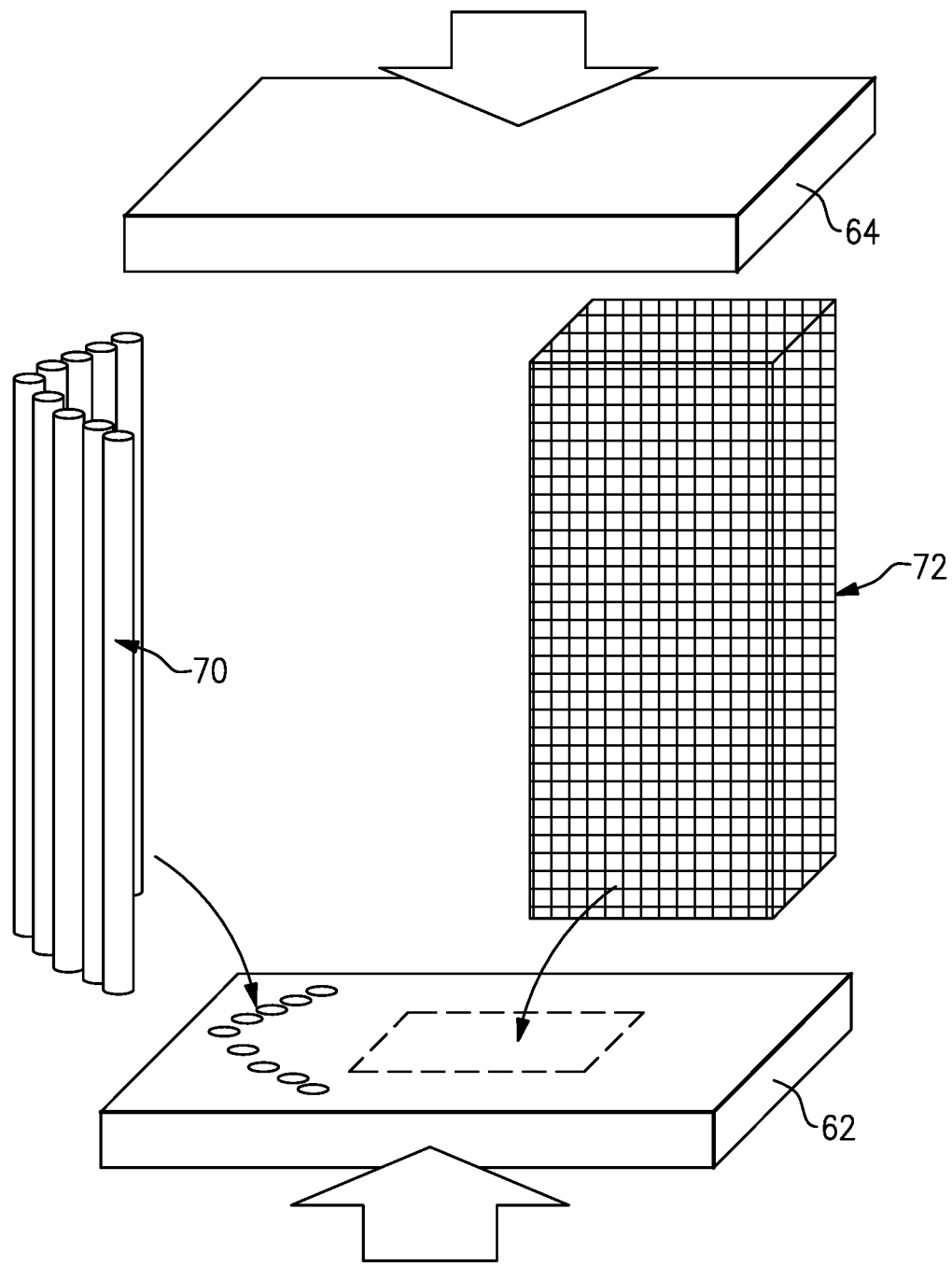
FIG. 4 illustrates an exploded view of an example airfoil having rods and a core structure.

FIG. 4 illustrates an exploded view of selected components of the airfoil 60, with the components schematically represented. To assemble the airfoil 60, the rods 70 and core structure 72 are trapped in compression between the platforms 62/64 to form the airfoil 60. In this regard, the trapping by the platforms 62/64 establishes the fixed positions of the rods 70 and the core structure 72, and thus also establishes the gap G. Should the rods 70 or core structure 72 require replacement, the airfoil 60 can be disassembled, the rod or rods 70 and/or core structure 72 can be replaced with new ones, and the airfoil 60 can be reassembled. Accordingly, the rods 70 and core structure 72 can be produced individually as new parts for an original airfoil or as replacement parts in an existing airfoil.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   an airfoil section defining an airfoil profile that is a peripheral shape of the airfoil section, the airfoil profile having a periphery defining a leading end, a trailing end, a pressure side, and a suction side, the airfoil section including
   a core structure, and
   a plurality of rods disposed at the periphery adjacent the core structure, wherein the plurality of rods are ceramic.

2. The airfoil as recited in claim 1, wherein the plurality of rods are spaced from the core structure such that there is a gap between the plurality of rods and the core structure.

3. The airfoil as recited in claim 2, wherein the core structure includes cooling holes that open to the gap.

4. The airfoil as recited in claim 3, wherein the plurality of rods are spaced-apart and define channels there between.

5. The airfoil as recited in claim 4, wherein the channels are circuitous.

6. The airfoil as recited in claim 1, wherein the plurality of rods includes a first, outer row of spaced-apart rods and a second, inner row of spaced-apart rods.

7. The airfoil as recited in claim 6, wherein the rods of the second row are staggered from the rods of the first row such that the rods of the second row align with gaps between the rods of the first row.

8. The airfoil as recited in claim 6, wherein the rods of at least one of the first row or the second row are uniformly spaced apart.

9. The airfoil as recited in claim 6, wherein the first row includes a number of rods and the second row includes a number of rods that is less than the number of rods in the first row.

10. The airfoil as recited in claim 1, wherein each of the plurality of rods has a uniform geometric cross-section and is solid.

11. The airfoil as recited in claim 10, wherein the uniform geometric cross-sections are equal in area.

12. The airfoil as recited in claim 1, wherein each of the plurality of rods is spaced apart from another nearest rod or rods by a distance, each of the plurality of rods defines a characteristic maximum cross-sectional dimension, and a ratio of the characteristic maximum cross-sectional dimension to the distance is from 5 to 30.

13. The airfoil as recited in claim 1, wherein the core structure is metal.

14. The airfoil as recited in claim 1, wherein the airfoil section includes inner and outer platforms, and the plurality of rods is affixed between the inner and outer platforms but is not directly secured to the core structure.

15. The airfoil as recited in claim 1, wherein the plurality of rods are at the leading end of the periphery.

16. The airfoil as recited in claim 1, wherein the plurality of rods have elliptical cross-sections.

17. The airfoil as recited in claim 16, wherein the plurality of rods are oriented end-to-end with respect to the elliptical cross-sections.

18. A gas turbine engine comprising:
a compressor section;
a combustor in fluid communication with the compressor section; and
a turbine section in fluid communication with the combustor, at least one of the turbine section or the compressor section including an airfoil having an airfoil section defining an airfoil profile that is a peripheral shape of the airfoil section, the airfoil profile having a periphery defining a leading end, a trailing end, a pressure side, and a suction side, the airfoil section including
a core structure, and
a plurality of rods disposed at the periphery adjacent the core structure, wherein the plurality of rods are ceramic.

19. The gas turbine engine as recited in claim 18, wherein the plurality of rods are spaced from the core structure such that there is a gap between the plurality of rods and the core structure, the core structure includes cooling holes that open to the gap, and the plurality of rods are spaced-apart and define channels there between.

20. The gas turbine engine as recited in claim 18, wherein the plurality of rods includes a first, outer row of spaced-apart rods and a second, inner row of spaced-apart rods, and the rods of the second row are staggered from the rods of the first row such that the rods of the second row align with gaps between the rods of the first row.

21. The gas turbine engine as recited in claim 18, wherein each of the plurality of rods is solid and has a uniform geometric cross-section.

22. A method of assembling an airfoil, the method comprising:
securing a plurality of rods and a core structure between inner and outer platforms to form an airfoil section, wherein the airfoil section has an airfoil profile that is a peripheral shape of the airfoil section, the airfoil profile has a periphery that defines a leading end, a trailing end, a pressure side, and a suction side, the plurality of rods are disposed at the periphery adjacent the core structure, and the plurality of rods are ceramic.

* * * * *